(12) United States Patent
Zhang

(10) Patent No.: US 7,555,047 B2
(45) Date of Patent: Jun. 30, 2009

(54) APPARATUS, METHOD AND COMPUTER PROGRAM FOR DETECTING ECHO IN THE FREQUENCY DOMAIN

(75) Inventor: Jun-ling Zhang, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 739 days.

(21) Appl. No.: 10/863,283

(22) Filed: Jun. 9, 2004

(65) Prior Publication Data

US 2005/0141625 A1 Jun. 30, 2005

(30) Foreign Application Priority Data

Dec. 29, 2003 (KR) .................. 10-2003-0099033

(51) Int. Cl.
*H04K 1/10* (2006.01)
(52) U.S. Cl. .................. 375/260; 375/229; 375/340
(58) Field of Classification Search .............. 375/229, 375/260, 340, 235, 346; 708/404
See application file for complete search history.

(56) References Cited

U.S. PATENT DOCUMENTS

| | | | |
|---|---|---|---|
| 7,212,569 B1 * | 5/2007 | Clark | 375/233 |
| 2002/0178195 A1 * | 11/2002 | Ryu | 708/404 |
| 2004/0254969 A1 * | 12/2004 | Pisoni | 708/404 |
| 2005/0259727 A1 * | 11/2005 | Benvenuto et al. | 375/233 |

FOREIGN PATENT DOCUMENTS

| EP | WO 03/105432 | * | 6/2003 |
|---|---|---|---|
| WO | WO 03/105432 | | 12/2003 |

OTHER PUBLICATIONS

Chinese Office Action dated Nov. 7, 2008.

* cited by examiner

*Primary Examiner*—Chieh M Fan
*Assistant Examiner*—Jaison Joseph
(74) *Attorney, Agent, or Firm*—Harness, Dickey & Pierce, PLC

(57) ABSTRACT

A method, apparatus and computer program for detecting an echo signal including interpolating at least one fast Fourier transformed OFDM signal received in the time-domain, interpolating the at least one signal generated by the time-domain interpolation in the frequency-domain, using a time-domain varying bandwidth low pass filter (LPF), with bandwidth that varies in response to a bandwidth control signal, measuring at least one signal to power ratio between a scattered pilot signal of the at least one signal generated by the time-domain interpolation and another scattered pilot signal of the at least one signal generated by the frequency-domain interpolation, and comparing the signal to power ratio to a threshold value to determine a state of an echo signal, and providing the bandwidth control signal with the determined echo state information to adjust the bandwidth of the time-domain LPF, based on the bandwidth control signal.

16 Claims, 4 Drawing Sheets

APPARATUS, METHOD AND COMPUTER PROGRAM FOR DETECTING ECHO IN THE FREQUENCY DOMAIN

PRIORITY STATEMENT

This application claims the priority of Korean Patent Application No. 2003-99033, filed on Dec. 29 2003 in the Korean Intellectual Property Office, the contents of which are herein incorporated by reference in its entirety.

BACKGROUND OF THE INVENTION

1. Field of the Invention

The present invention relates generally to an apparatus, method and computer program for detecting an echo signal in the frequency domain that may be present in a Digital Video Broadcasting-Terrestrial (DVB-T) receiver.

2. Description of the Related Art

In digital television (DTV), two data transmission methods may be used: a Vestigial Side Band (VSB) method, which is a single carrier conversion method, and a Coded Orthogonal Frequency Division Multiplexing (COFDM) method, which is a multi-carrier conversion method. A DVB-T system adopting the COFDM data transmission method may be recognized as a next-generation terrestrial DTV transmission system and has been used for experimental broadcasting in Europe. The DVB-T system may be used in the global terrestrial digital market along with the U.S. terrestrial broadcasting standard. A DVB-T modulation/demodulation method may use an OFDM method for a terrestrial wave. In general, single carrier modulation/demodulation methods may transmit information in series, where the OFDM method may transmit information dispersively at a plurality of different frequencies. Therefore, the OFDM method may be suitable for multi-path channel communications.

The DVB-T receiver may provide estimation of a channel for a modulated signal, which may be required for coherent demodulation of the modulated signal received. However, coherent demodulation may not be achieved until a channel estimation unit of the DVB-T receiver estimates both a channel and any residual phase errors that may be present.

FIG. 1 is a block diagram of a conventional DVB-T receiver. Referring to FIG. 1, the conventional DVB-T receiver includes an Analog-to-Digital (A/D) converter 101, an I/Q generator 102, a fast Fourier transform generator (FFT) 103, an equalizer 104, a Forward Error Correction (FEC) unit 105, a sampling frequency synchronization unit 106, and a carrier synchronization unit 107.

An Intermediate Frequency (IF) input signal of the conventional DVB-T receiver may be obtained from receiving an OFDM signal via an antenna and converting the OFDM signal into the IF signal using a tuner (not shown). The IF signal may be converted into a digital signal in the A/D converter 101 and may be output to the I/Q generator 102. The digital signal input to the I/Q generator 102 may contain only an In-phase (I) component. The I/Q generator 102 may convert the input digital signal into a complex signal containing an (I) component and a Quadrature (Q) component. The FFT 103 may perform a Fast Fourier Transform 'FFT' on the signal output from the I/Q generator 102. The equalizer 104 may provide compensation for a carrier signal which may be distorted due to channel distortion, using the signal output from the FFT 103. The FEC unit 105 may detect errors in the data of the OFDM signal using a designated error detection method, and may perform Forward Error Correction 'FEC' on the detected errors.

The sampling frequency synchronization unit 106 may transmit a signal to the I/Q generator 102, which may enable sampling frequency synchronization using the signal output of the FFT 103. The carrier synchronization unit 107 may transmit a signal to the I/Q generator 102, which enables carrier synchronization using the signals output from the I/Q generator 102 and the FFT 103.

The equalizer 104 may estimate characteristics of a channel for transmission of an OFDM signal by using scattered pilot signals, and may compensate for the estimated characteristics of the channel.

Application of the scattered pilot signals may be further defined in the DVB-T standard, which requires channel estimation through interpolation. For example, a plurality of Channel Impulse Response (CIR) samples may be obtained using already known scattered pilot signals, and interpolation may be performed on these samples in the time and frequency domains for channel estimation. Two-Dimensional (2D) interpolation, with respect to time and frequency, may include performing interpolation in the time domain based on characteristics of a channel transfer function $CIR_T(f)$, and interpolation performed in the frequency domain based on characteristics of a channel transfer function $CIR_F(f)$.

Interpolation may be optimized using Equation (1) wherein a Minimum Mean Square Error (MMSE) may be applied to a channel estimation value $\hat{H}_m(k)$ and a real CIR value $H_m(k)$ of an $m^{th}$ subcarrier of a $k^{th}$ OFDM symbol respectively:

$$\partial_{CIR}{}^2 = E\{(\hat{H}_m(k) - H_m(k))^2\} \tag{1}$$

to calculate $\partial_{CIR}{}^2$, a 2D representation of interpolation. In calculating the 2D interpolated CIR, the correlation functions of the CIR in the time/frequency domain, noise deviation that disturbs the CIR samples, the total number of the scattered pilot signals, and the patterns of the scattered pilot signals may be considered.

Channel estimation using the MMSE may be achieved with a 2D Wiener filter, however computation may be complex when using the 2D Wiener filter. The use of a channel transfer function in the frequency domain $CIR_F(f)$ whose range falls within $0 \leq \tau_n \leq T_{Gl}$ and a channel transfer function in the time domain $CIR_T(f)$ that satisfies $|f_{Dn}| \leq |f_{Dmax}|$ may simplify the process of channel estimation. For example, $\tau_n$ denotes a multi-path delay in an $n^{th}$ path, $T_{Gl}$ denotes guard intervals of an OFDM signal, $|f_{Dn}|$ denotes a Doppler spread along the $n^{th}$ path, and $|f_{Dmax}|$ denotes a maximum Doppler spread that is limited to a time interval of an OFDM symbol.

Alternatively, the 2D Wiener filter may be replaced with two one-dimensional (1D) filters that continuously operate and perform time-domain interpolation and frequency-domain interpolation. The two 1D filter approach may reduce the complexity of the calculations. The two 1D filters may be implemented with varying CIR functions and associated intervals.

Frequency-domain interpolation may use an equivalent time-domain Low-Pass Filter (LPF) with a bandwidth denoted $T_{Gl}$, similar to a Wiener filter or a filter based on Inverse Discrete Fourier Transform/Discrete Fourier Transform (IDFT/DFT) operations. The LPF may provide the frequency-domain interpolation process with a reliable channel estimation result.

However, when the guard interval $T_{Gl}$ is too small, that is the channel transfer function $CIR_F(f)$ and the bandwidth of the equivalent time-domain LPF for the frequency-domain interpolation are matched too closely, a system may become vulnerable to a multi-path channel containing an echo component whose delay is larger than the guard interval $T_{GI}$

SUMMARY OF THE INVENTION

Exemplary embodiments of the present invention are directed to preventing distortion of a demodulated signal, which may be caused by echo.

Exemplary embodiments of the present invention may provide an optimum equalizer for adopting a frequency domain echo detection method.

An exemplary embodiment of the present invention is directed to a method for echo detection, which includes measuring a first signal power of a scattered pilot signal obtained from a first time-domain interpolated signal, and measuring a second signal power of another scattered pilot signal obtained from a second time-domain interpolated signal, where the second time-domain interpolated signal is obtained from interpolating the first time-domain interpolated signal in the frequency domain. A signal to power ratio between the first and second signal powers measured may be calculated and compared to a threshold level to determine the state of an echo signal, and a bandwidth control signal may be obtained based on the determined state of the echo signal.

Another exemplary embodiment of the present invention is directed to a device which detects an echo signal, including a first calculation device, which measures a first signal power of a scattered pilot signal obtained from a first interpolated signal, where the first interpolated signal is interpolated in the time-domain, a second calculation device used to detect an echo signal, which measures a second signal power of another scattered pilot signal obtained from a second interpolated signal, where the second interpolated signal is obtained from interpolating the first interpolated signal in the frequency domain. A divider may be used to calculate a signal to power ratio between the first and second signal powers measured, and a comparator may also be used to provide a comparison between the calculated signal to power ratio and a threshold level, to determine the state of an echo signal and provide a bandwidth control signal to the second calculation device based on the determined state of the echo signal.

Another exemplary embodiment of the present invention is directed to a computer program product. The computer program product may include a computer-readable medium having computer program logic stored thereon for enabling a processor to detect an echo signal. The computer program logic may cause the processor to compensate for channel distortion in a fast Fourier transformed OFDM signal using interpolation in the time and frequency domains.

Another exemplary embodiment of the present invention is directed to a computer data signal embodied, for example, in a carrier wave for detecting an echo signal. The carrier wave may include one or more segments of code to compensate for channel distortion in a fast Fourier transformed OFDM signal using the output generated by interpolation operations in the time and frequency domains.

In an exemplary embodiment, the development of an echo detection mechanism, which is capable of detecting an echo signal with a delay that exceeds the guard interval $T_{GI}$ of a corresponding LPF and/or which provides an adjustment to the bandwidth of a time-domain LPF, may be used when performing frequency-domain interpolation.

BRIEF DESCRIPTION OF THE DRAWINGS

The present invention will become more apparent to those of ordinary skill in the art by describing, in detail, exemplary embodiments thereof with reference to the attached drawings, wherein like elements are represented by like reference numerals, which are given by way of illustration only and thus do not limit the exemplary embodiments of the present invention.

DETAILED DESCRIPTION OF THE INVENTION

Figure 1:
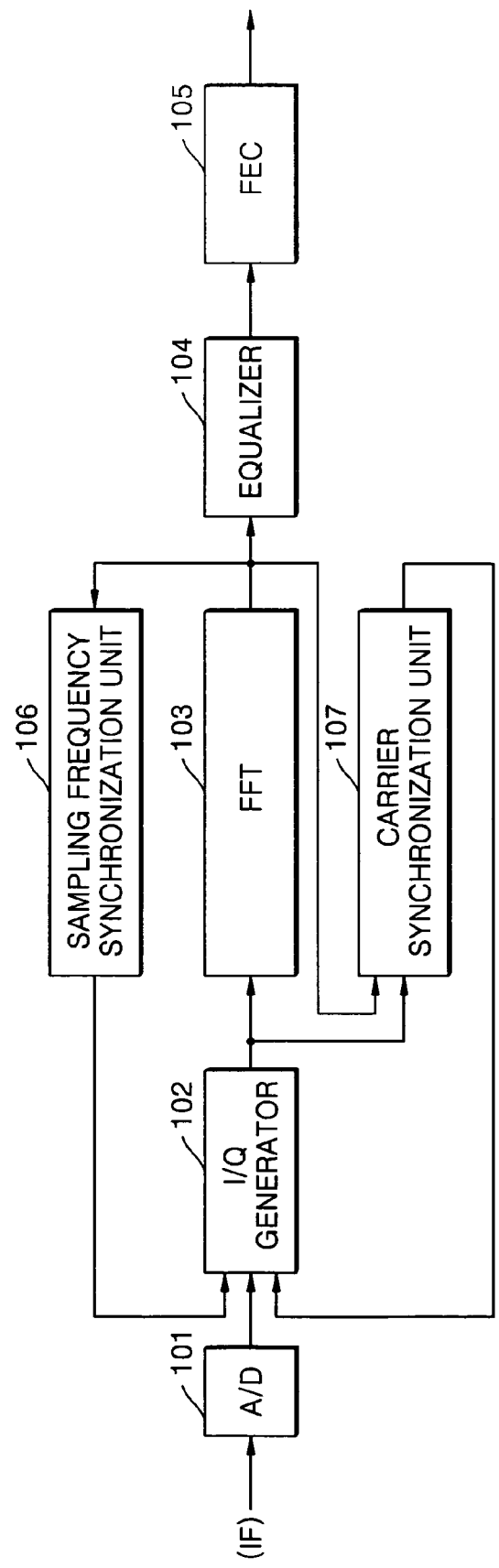
FIG. 1 is a block diagram of a conventional Digital Video Broadcasting-Terrestrial (DVB-T) receiver.
Figure 2:
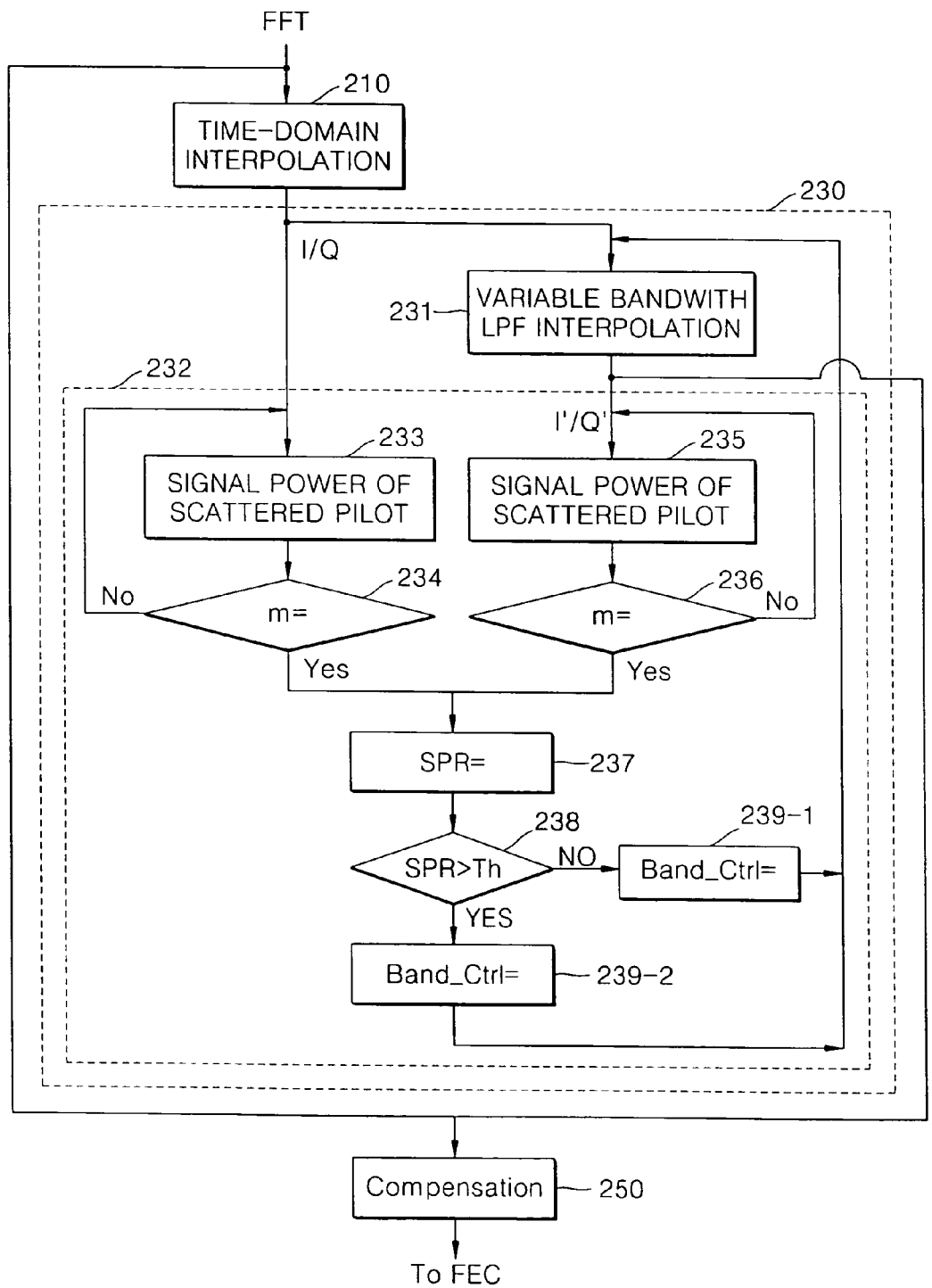
FIG. 2 is a flowchart illustrating a frequency-domain echo detection method according to an exemplary embodiment of the present invention.

FIG. 2 is a flowchart illustrating a frequency-domain echo detection method according to an exemplary embodiment of the present invention. FIG. 2 illustrates time-domain interpolation (operation 210), frequency-domain interpolation (operation 230), and/or channel distortion compensation (operation 250) according to an exemplary embodiment of the present invention.

In the time-domain interpolation (operation 210), a fast Fourier transformed OFDM signal is received, and time-domain interpolation is performed on the signal.

The frequency-domain interpolation (operation 230) may include interpolation (operation 231) using a time-domain Low-Pass Filter (LPF) or equivalent, of a variable bandwidth, and echo detection (operation 232). Interpolation (operation 231), may include performing frequency-domain interpolation on an output signal (I/Q), generated by the time-domain interpolation (operation 210), while changing the variable bandwidth of the LPF, based on a bandwidth control signal (Band_Ctrl).

Performing echo detection (operation 232) may include measuring the signal power of a scattered pilot signal according to the output signal (I/Q) generated (operations 233 and 234), and measuring the signal power of a scattered pilot signal with respect to a feedback signal (I'/Q'). The feedback signal (I'/Q') may be generated by the frequency-domain interpolation (operations 235 and 236). Echo detection (operation 232) may also include calculating a signal to power ratio between signal powers measured in operations 233 and 235 (operation 237), comparing the signal to power ratio to a specified threshold level (operation 238), determining a state of the echo signal based on the comparison result, and/or outputting a bandwidth control signal (Band_Ctrl) based on the determined state of the echo (operations 239-1, and 239-2).

Compensation (operation 250), may include compensating for channel distortion in the fast Fourier transformed OFDM signal using the signal (I'/Q') generated by frequency-domain interpolation (operation 230).

Figure 3:
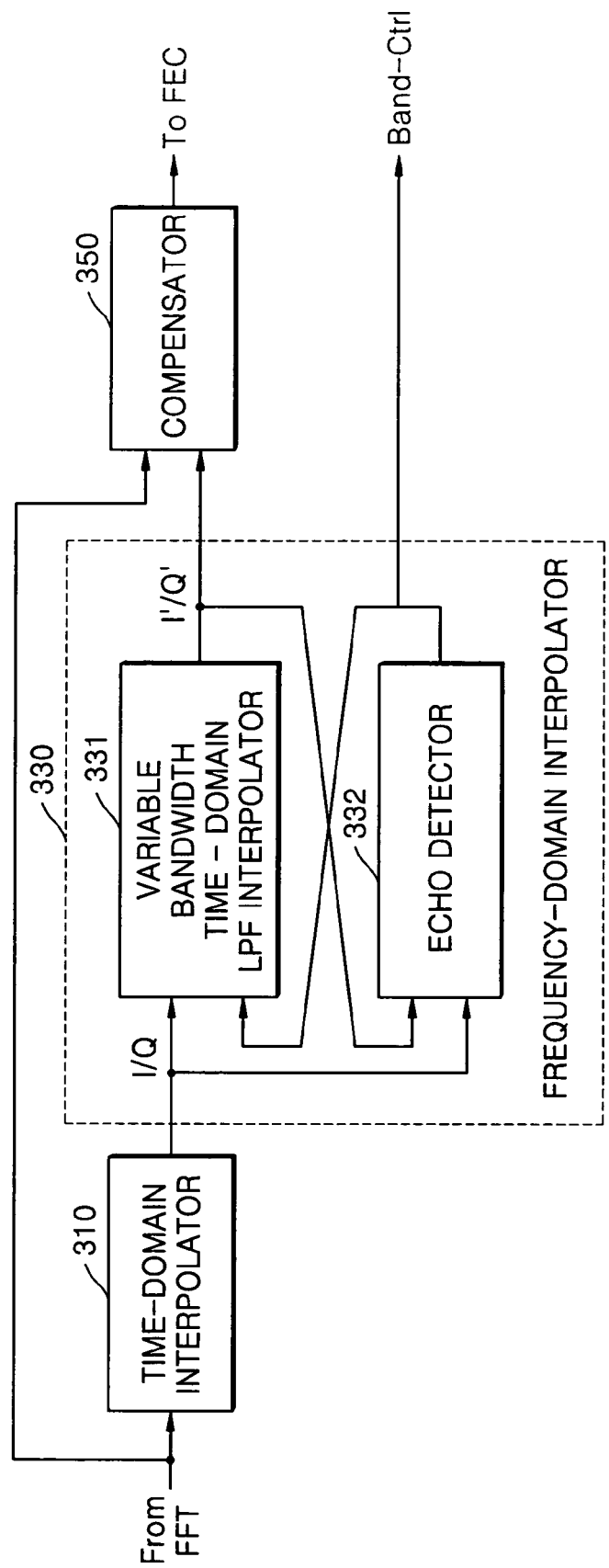
FIG. 3 is a block diagram of an equalizer according to an exemplary embodiment of the present invention.

FIG. 3 is a block diagram of an equalizer in accordance with an exemplary embodiment of the present invention. The equalizer of FIG. 3 may include a time-domain interpolator 310, a frequency-domain interpolator 330, and/or a compensator 350.

Referring to FIG. 3, the time-domain interpolator 310 may receive a fast Fourier transformed OFDM signal and may perform time-domain interpolation on the OFDM signal.

The frequency-domain interpolator 330 may include a time-domain variable bandwidth LPF interpolator 331 and an echo detector 332. The time-domain variable bandwidth LPF interpolator 331 may perform frequency-domain interpolation on an output signal I/Q of the time domain interpolator 310. The output signal may be interpolated by the time-domain variable bandwidth LPF interpolator 331, while the bandwidth of the LPF is adjusted in response to a bandwidth control signal (Band_Ctrl) provided by the echo detector 332. Echo detector 332 is illustrated in FIG. 4, according to an exemplary embodiment of the present invention.

The compensator 350 of FIG. 3 may compensate for channel distortion in the fast Fourier transformed OFDM signal using a signal (I'/Q') resulting from the frequency-domain interpolation.

Figure 4:
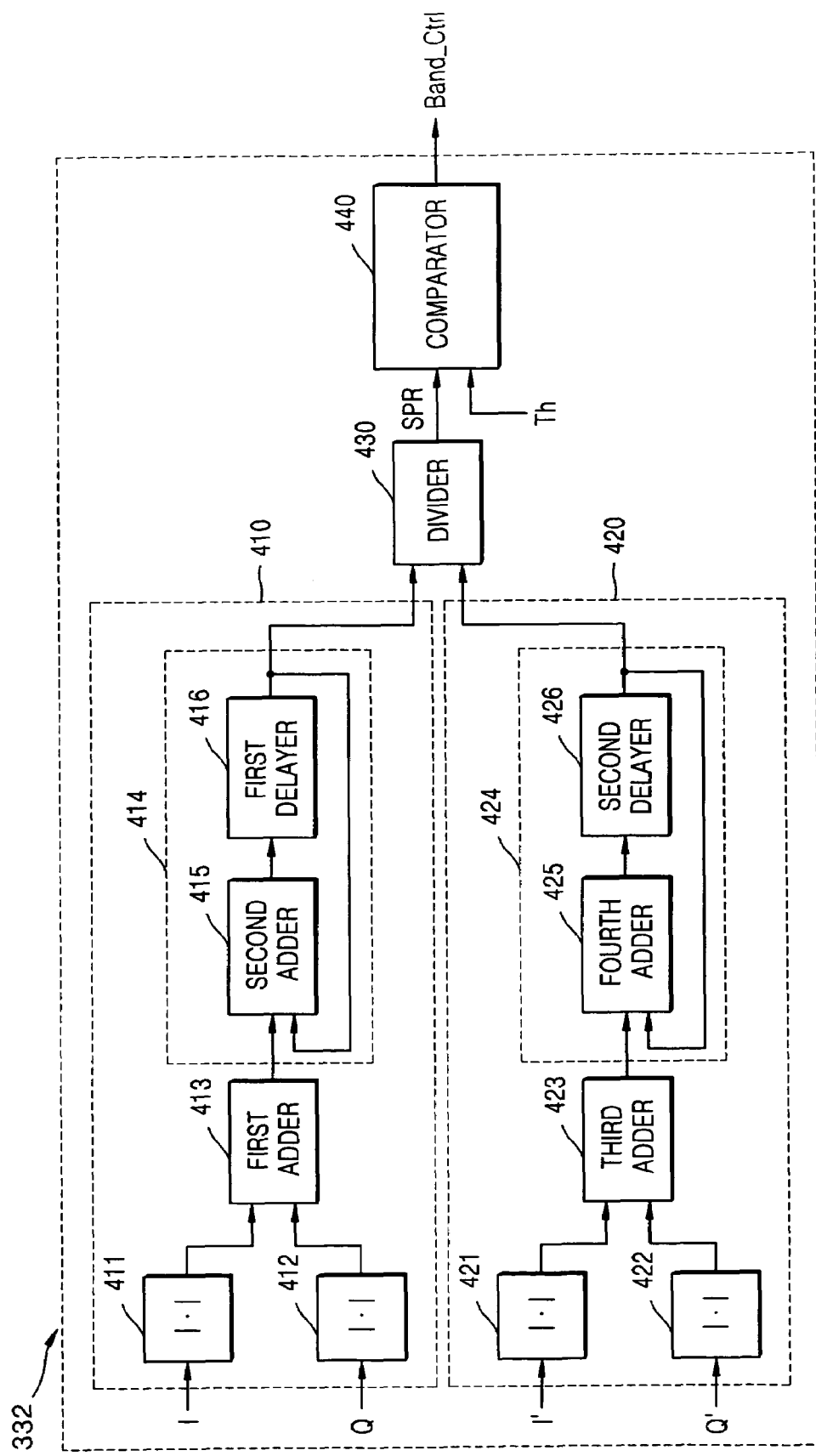
FIG. 4 is a block diagram of an echo detector included in the equalizer of FIG. 3, according to an exemplary embodiment of the present invention.

FIG. 4 is a block diagram of an example echo detector 332 of FIG. 3, according to an exemplary embodiment of the present invention. Referring to FIG. 4, the echo detector 332 may include a first calculator 410 which measures the signal power of a scattered pilot signal corresponding to the output signal (I/Q) of time-domain interpolator 310, and a second calculator 420 which measures signal power of a scattered pilot signal corresponding to the output signal (I'/Q') of the frequency-domain interpolation. The output signal (I'/Q') may be obtained by interpolating the output signal (I/Q) of the time-domain interpolator 310, with the time-domain variable bandwidth LPF interpolator 331. A divider 430 may calculate and/or output a signal to power ratio (SPR) between the signal powers measured by the first and second calculators 410 and 420. A comparator 440 may compare the signal to power ratio (SPR) output from the divider 430 to a specified threshold (Th) level to determine the state of an echo signal detected, and/or output the bandwidth control signal (Band_Ctrl) based on the determined state of the echo signal.

The first calculator 410 according to an exemplary embodiment of the present invention may include a first absolute value calculator 411, which calculates the absolute value $(I_{m,sp}(k))$ of an in-phase (I) component of an $m^{th}$ scattered pilot signal of a $k^{th}$ OFDM symbol, that has yet to pass through the time-domain variable bandwidth LPF interpolator 331. The first calculator 410 may include a second absolute value calculator 412, which measures the absolute value $(Q_{m,sp}(k))$ of a quadrature (Q) component of the $m^{th}$ scattered pilot signal of the $k^{th}$ OFDM symbol that has yet to pass through the time-domain variable bandwidth LPF interpolator 331. 410 may further include a first adder 413 which combines the absolute values $(I_{m,sp}(k))$ and $(Q_{m,sp}(k))$, and a first accumulator 414, which accumulates the total signal powers of the I and Q components while changing the value of m in the $k^{th}$ OFDM symbol.

The first accumulator 414 may include a second adder 415 and/or a first flip flop or delayer 416. The second adder 415 may combine a signal output from the first adder 413, and a signal output from the first flip flop 416, in which previous signals output from the first adder 413 may have been accumulated for a specified time and stored as data.

The second calculator 420 according to an exemplary embodiment of the present invention may include a third absolute value calculator 421, which calculates the absolute value $(I'_{m,sp}(k))$ of an I' component of the $m^{th}$ scattered pilot signal of the $k^{th}$ OFDM symbol that passes through the time-domain variable bandwidth LPF interpolator 331. 420 may include a fourth absolute value calculator 422, which calculates the absolute value $(Q'_{m,sp}(k))$ of a Q component of the $m^{th}$ scattered pilot of the $k^{th}$ OFDM symbol that passes through the time-domain variable bandwidth LPF interpolator 331. The second calculator 420 may further include a third adder 423, which combines the absolute values $(I'_{m,sp}(k))$ and $(Q'_{m,sp}(k))$, and a second accumulator 424 that accumulates the total of the signal powers of the I' and Q' components while changing a value m in the $k^{th}$ OFDM symbol.

The second accumulator 424 may include a fourth adder 425 and/or a second flip flop or delayer 426. The fourth adder 425 may combine a signal output from the third adder 423, and a signal output from the second flip flop 426, in which previous signals output from the third adder 423 may have been accumulated for a specified duration of time and stored as data.

The divider 430 may measure and/or output a signal to power ratio (SPR) between a signal power output from the first accumulator 414, which measures the total signal power of the I and Q components of the scattered pilot signals, and a signal power output from a second accumulator 424 which measures the total signal powers of the I' and Q' components of the scattered pilot signals.

The comparator 440 may compare the signal to power ratio (SPR) to a specified threshold value (Th), and/or output a bandwidth control signal (Band_Ctrl) based on the result of the comparison. The value of the bandwidth control signal (Band_Ctrl) may vary depending on the size of the detected echo delay. The bandwidth of the time-domain variable bandwidth LPF interpolator 331 may be adjusted using values of the bandwidth control signal (Band_Ctrl).

A Wiener filter algorithm or an algorithm based on an Inverse Discrete Fourier Transform/Discrete Fourier Transform (IDFT/DFT), which can be modeled using a time-domain LPF or equivalent, may be used for the variable bandwidth LPF interpolation (operation 231) of the time-domain variable bandwidth LPF interpolator 331.

Channel estimation may be achieved by continuously performing interpolation on already-known scattered pilot signals, i.e., Channel Impulse Response (CIR) samples of the time domain and frequency domain. The estimated CIR samples may be compensated for as a data sub-carrier during compensation (operation 250) using the compensator (350).

To detect echo (operation 232), the I/Q and the I'/Q' signals, among the components of the scattered pilot signals, may be provided as input to the echo detector 332. The scattered pilot signals may enable the measurement of a signal to power ratio between an OFDM symbol and scattered pilot signals before and/or after variable bandwidth LPF interpolation (operation 231). For example, the I'/Q' signal may have already been processed by the time-domain variable bandwidth LPF interpolator 331, before the I/Q signal is processed.

The signal to power ratio (SPR(k)) of Equation (2) according to an exemplary embodiment of the present invention, may include a bandwidth ($T_{GI}$) which is set in the time-domain variable bandwidth LPF interpolator 331 during the variable bandwidth LPF interpolation (operation 231). The signal to power ratio (SPR(k)) may be calculated by the divider 430. The calculation of the signal to power ratio (operation 237) may be expressed by:

$$SPR(k) = \frac{\sum_{m=\frac{FIR}{2}}^{N_{SP}-\frac{FIR}{2}} [|I_{m,SP}(k)| + |Q_{m,SP}(k)|]}{\sum_{m=\frac{FIR}{2}}^{N_{SP}-\frac{FIR}{2}} [|I'_{m,SP(k)}| + |Q'_{m,SP}(k)|]} \quad (2)$$

where, SPR(k) denotes a signal to power ratio with respect to a $k^{th}$ OFDM symbol, where $N_{SP}$ denotes a total number of scattered pilot signals per OFDM symbol obtained, by the time-domain interpolation (operation 210) using the time-domain interpolator 310. The OFDM operation may include determining whether to use a 2K Fast Fourier Transform (FFT) mode, using 1705 carriers, or an 8K FFT mode, using 6817 carriers. The determining process may depend on a total number of carriers or scattered pilot signals per OFDM symbol. For example, the total number of scattered pilot signals per OFDM symbol ($N_{SP}$) is 568 in the 2K FFT mode, and 2272 in the 8K FFT mode, if one scattered pilot is obtained for every three sub carriers, after the time-domain interpolation operation. Finite Impulse Response (FIR) denotes an order for a time-domain LPF or equivalent, which may be adopted by the variable bandwidth LPF interpolation (operation 231).

According to an exemplary embodiment of the present invention $I_{m,SP}(k)/Q_{m,SP}(k)$ may denote an I/Q component of an $m^{th}$ scattered pilot of a $k^{th}$ OFDM symbol that has yet to be processed by the time-domain variable bandwidth LPF interpolator 331, and $I'_{m,SP}(k)/Q'_{m,SP}(k)$ may denote an I/Q component of the $m^{th}$ scattered pilot of the $k^{th}$ OFDM symbol that has already been processed by the time-domain variable bandwidth LPF interpolator 331.

The absolute values $|I_{m,SP}(k)|$ and $|Q_{m,SP}(k)|$ of the I/Q component may be calculated in operation 233, using the first absolute value calculator 411, and/or the second absolute value calculator 412, and the first adder 413.

In operations 233 and 234, the first accumulator 414 may sum the absolute values $|I_{m,SP}(k)|$ and $|Q_{m,SP}(k)|$ while increasing m from $$\frac{FIR}{2}$$

to $$N_{SP} - \frac{FIR}{2},$$

and may also accumulate the obtained sums.

The absolute values $|I'_{m,SP}(k)|$ and $|Q'_{m,SP}(k)|$ of the I/Q components of the scattered pilot signals, which have been passed through the equivalent time-domain variable bandwidth LPF interpolator 331 and have become I'/Q' components, may be calculated in operation 235. The calculations of operation 235 may be performed by using the third and fourth absolute value calculator 421 and 422 and/or the third adder 423.

In operations 235 and 236, according to an exemplary embodiment of the present invention, the second accumulator 424 may sequentially sum the absolute values $|I'_{m,SP}(k)|$ and $|Q'_{m,SP}(k)|$ while increasing m from $$\frac{FIR}{2} \text{ to } N_{SP} - \frac{FIR}{2},$$

and may also accumulate the obtained sums.

In operation 237, the signal to power ratio (SPR) may be calculated using the divider 430. In operations 238, 239-1, and 239-2, the comparator 440 may compare the signal to power ratio (SPR) to a specified threshold level (Th) and/or output a bandwidth control signal (Band_Ctrl) based on the comparison result. For example, if (SPR>Th), then an echo signal may exist with a delay larger than the initial bandwidth, $T_{GI}$ of the time-domain variable bandwidth LPF interpolator 331. If the delay of the echo detected is larger than the initial bandwidth of the time-domain variable bandwidth LPF interpolator 331 then the bandwidth of the LPF is increased. In operation 231, the frequency-domain interpolator 330 changes the bandwidth of the time-domain variable bandwidth LPF 331, using the bandwidth control signal (Band_Ctrl) which contains information regarding the echo components, thereby preventing distortion of a demodulated signal.

An equalizer adopting frequency-domain echo detection, according to an exemplary embodiment of the present invention, may include detecting an echo signal with a delay larger than a bandwidth of the time-domain variable bandwidth LPF, which may be used for the frequency-domain interpolation. The equalizer may further include reflecting the detected echo in a demodulated signal, thereby reducing distortion of the demodulated signal.

The exemplary methods of detecting an echo signal of FIGS. 2-3 and/or calculating a bandwidth control signal of FIG. 4, may be embodied in software as a computer program. For example, a program in accordance with the exemplary embodiments of the present invention may be a computer program product causing a computer to execute steps of the exemplary method of detecting an echo signal. The computer program product may include a computer-readable medium having computer program logic or code portions embodied thereon for enabling a processor, such as a computer including a processor to perform the methodology for detecting echo signals and generating a bandwidth control signal in accordance with the exemplary methods.

The computer-readable storage medium may be a built-in medium installed inside a computer main body or removable medium arranged so that it can be separated from the computer main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, such as floppy disks (trademark), cassette tapes, and removable hard disks; media with a built-in rewriteable non-volatile memory such as memory cards; and media with a built-in ROM, such as ROM cassettes.

The computer program logic, for example, may thus cause the processor to perform one or more of the operations illustrated in the method of FIG. 2. Therefore, by causing a computer to execute the program, the echo detection method of FIG. 2 may be accomplished. As a result, the echo detection provided by the computer executing the program may be similar to the echo detection provided by the exemplary echo detection method.

These programs may also be provided in the form of an externally supplied propagated signal and/or a computer data signal embodied in a carrier wave. The computer data signal embodying one or more functions or operations of the exemplary methodology may be carried on a carrier wave for transmission and/or reception by an entity that executes the operations of the exemplary methodology. For example, the functions or operations of the exemplary embodiments may be implemented by processing one or more code segments of the carrier wave in a computer in accordance with the exemplary echo detection method described herein.

Further, such programs, when recorded on computer-readable storage media, may be readily stored and distributed. The storage medium, as it is read by a computer, may thus enable the detection of echo signals by the exemplary echo detection method described herein.

While the present invention has been particularly shown and described with reference to exemplary embodiments thereof, it will be understood by those skilled in the art that various changes in form and details may be made therein without departing from the spirit and scope of the invention. For example, the exemplary apparatuses and methods described by FIGS. 2-4 may be implemented in hardware and/or software. The hardware/software implementation may include a combination a combination of processor(s) and articles(s) of manufacture. The article(s) of manufacture may include storage media and executable computer program(s). The executable program(s) may include the instructions to perform detailed operations or functions. The computer executable program(s) may also be provided as part of externally supplied propagated signal(s). Such variations are not to be regarded as departure from the spirit and scope of the exemplary embodiments of the present invention, and all such modifications as would be obvious to one skilled in the art are intended to be included within the scope of the following claims.

What is claimed is:

1. A method of detecting an echo signal in a frequency domain, comprising:
   interpolating at least one fast Fourier transformed Orthogonal Frequency Division Multiplexing (OFDM) received signal, in the time-domain;
   interpolating at least one signal generated by the time-domain interpolation in the frequency-domain, using a time-domain variable bandwidth Low-Pass Filter (LPF), with a bandwidth that varies in response to a bandwidth control signal;
   measuring at least one signal power ratio between a scattered pilot signal of the at least one signal generated by the time-domain interpolation and another scattered pilot signal of at least one signal generated by the frequency-domain interpolation;
   comparing the measured at least one signal power ratio to a threshold value to determine a state of an echo signal and generating the bandwidth control signal with the echo state information; and
   adaptively changing the bandwidth of the variable bandwidth LPF using the bandwidth control signal; and
   compensating for channel distortion in the fast Fourier transformed OFDM received signal using the signal generated by the frequency-domain interpolation.

2. The method of claim 1, wherein the frequency-domain interpolation further comprises:
   performing a frequency-domain interpolation on the signal generated by the time-domain interpolation, using a time-domain variable bandwidth LPF, while changing the bandwidth of the variable bandwidth LPF in response to the bandwidth control signal; and
   detecting the echo signal from the fast Fourier transformed OFDM signal.

3. The method of claim 2, wherein detecting the echo signal further comprises:
   accumulating at least two signal powers of at least two scattered pilot signals corresponding to at least two signals generated by the time-domain interpolation;
   accumulating at least two signal powers of at least two scattered pilot signals corresponding to at least two signals generated by the frequency-domain interpolation;
   measuring at least one signal power ratio between the accumulated at least two signal powers corresponding to the at least two signals generated by the time-domain interpolation and the accumulated at least two signal powers corresponding to the at least two signals generated by the frequency-domain interpolation;
   comparing the at least one measured signal power ratio to the threshold value to determine the state of the echo; and
   generating the bandwidth control signal based on the determined state of the echo.

4. The method of claim 3, wherein the signal power of the at least two scattered pilot signals corresponding to the at least two signals generated by the time-domain interpolation is:

$$\sum_{m=-\frac{FIR}{2}}^{N_{SP}-\frac{FIR}{2}} [|I_{m,SP}(k)| + |Q_{m,SP}(k)|];$$

the signal power of the at least two scattered pilot signals with respect to the at least two signals generated by the frequency-domain interpolation is:

$$\sum_{m=-\frac{FIR}{2}}^{N_{SP}-\frac{FIR}{2}} [|I'_{m,SP}(k)| + |Q'_{m,SP}(k)|]; \text{ and}$$

the signal power ratio is:

$$\frac{\sum_{m=-\frac{FIR}{2}}^{N_{SP}-\frac{FIR}{2}} [|I_{m,SP}(k)| + |Q_{m,SP}(k)|]}{\sum_{m=-\frac{FIR}{2}}^{N_{SP}-\frac{FIR}{2}} [|I'_{m,SP(k)}| + |Q'_{m,SP}(k)|]},$$

wherein $N_{SP}$ denotes a total number of scattered pilot signals per OFDM symbol on which the time-domain interpolation is performed, FIR denotes an order of the time-domain LPF used in the frequency-domain interpolation, $I_{m,SP}(k)/Q_{m,SP}(k)$ denotes an I/Q component of an $m^{th}$ scattered pilot of a $k^{th}$ OFDM symbol on which the frequency-domain interpolation is not performed, $I'_{m,SP}(k)/Q'_{m,SP}(k)$ denotes an I/Q component of the $m^{th}$ scattered pilot of the $k^{th}$ OFDM symbol on which the frequency-domain interpolation is performed, I denotes an in-phase component of a scattered pilot signal, and Q denotes a quadrature component of the scattered pilot signal.

5. The method of claim 2, wherein the bandwidth control signal is generated to provide an increase for the bandwidth range of the variable bandwidth LPF used in the frequency-domain interpolation when the signal power ratio is greater than the threshold value, and when the signal power ratio is not greater than the threshold value the bandwidth control signal is generated to maintain a current bandwidth for the variable bandwidth LPF used in the frequency-domain interpolation.

6. An equalizer comprising:
   a time-domain interpolator which receives a fast Fourier transformed Orthogonal Frequency Division Multiplexing (OFDM) signal and performs time-domain interpolation on the received signal;

a frequency-domain interpolator that performs frequency-domain interpolation on a signal generated by the time-domain interpolator by using a time-domain Low-Pass Filter (LPF) with a bandwidth that varies in response to a bandwidth control signal;

a compensator that compensates for channel distortion in the fast Fourier transformed OFDM signal using the signal generated by the frequency-domain interpolator; and an echo detector that calculates first signal powers based on signals generated by the time-domain interpolator, calculates second signal powers based on signals generated by the frequency-domain interpolator, and generates the bandwidth control signal based on at least one ratio of the first and second signal powers.

7. The equalizer of claim 6, echo detector further comprising:

a first calculator which calculates the first signal powers, the first signal powers being signal powers of scattered pilot signals obtained from at least two signals generated by the time-domain interpolator;

a second calculator which calculates the second signal powers, the second signal powers being signal powers of scattered pilot signals obtained from at least two signals generated by the frequency-domain interpolator;

a divider which measures signal power ratios between the first and second signal powers; and a comparator that compares the measured signal power ratios with a threshold value to determine the state of an echo signal and generates the bandwidth control signal containing information regarding the determined state of the echo.

8. The equalizer of claim 7, wherein the first calculator comprises:

a first absolute value calculator which calculates the absolute value of an in-phase component of the signal generated by the time-domain interpolator;

a second absolute value calculator which calculates the absolute value of a quadrature component of the signal generated by the time-domain interpolator;

a first adder that combines signals output from the first and second absolute value calculators; and a first accumulator that accumulates at least two signals output from the first adder.

9. The equalizer of claim 8, wherein the second calculator comprises:

a third absolute value calculator which calculates the absolute value of an in-phase component of the signal generated by the frequency-domain interpolator;

a fourth absolute value calculator which calculates the absolute value of a quadrature component of the signal generated by the frequency-domain interpolator;

a third adder which combines signals output from the third and fourth absolute value calculators; and a second accumulator which accumulates at least two signals output from the third adder.

10. The equalizer of claim 9, wherein the first accumulator comprises:

a second adder which combines a signal output from the first adder and a signal output from a first delayer which stores a signal output from the second adder.

11. The equalizer of claim 9, wherein the second accumulator comprises:

a fourth adder that combines a signal output from the third adder and a signal output from a second delayer which stores a signal output from the fourth adder.

12. The equalizer of claim 7, wherein a signal output from the first calculator is:

$$\sum_{m=-\frac{FIR}{2}}^{N_{SP}-\frac{FIR}{2}} [|I_{m,SP}(k)| + |Q_{m,SP}(k)|];$$

a signal output from the second calculator is:

$$\sum_{m=-\frac{FIR}{2}}^{N_{SP}-\frac{FIR}{2}} [|I'_{m,SP}(k)| + |Q'_{m,SP}(k)|]; \text{ and}$$

the signal power ratio is:

$$\frac{\sum_{m=-\frac{FIR}{2}}^{N_{SP}-\frac{FIR}{2}} [|I_{m,SP}(k)| + |Q_{m,SP}(k)|]}{\sum_{m=-\frac{FIR}{2}}^{N_{SP}-\frac{FIR}{2}} [|I'_{m,SP(k)}| + |Q'_{m,SP}(k)|]},$$

wherein $N_{SP}$ denotes a total number of scattered pilot signals per OFDM symbol processed by the time-domain interpolation, FIR denotes an order of an equivalent time domain adopted by the LPF interpolation, $I_{m,SP}(k)/Q_{m,SP}(k)$ denotes an I/Q component of the $m^{th}$ scattered pilot of a $k^{th}$ OFDM symbol not processed by the frequency-domain interpolator, $I'_{m,SP}(k)/Q'_{m,SP}(k)$ denotes an I/Q component of the $m^{th}$ scattered pilot of the $k^{th}$ OFDM symbol processed by the frequency-domain interpolator, I denotes an in-phase component of the scattered pilot in complex coordinates, and Q denotes a quadrature component of the scattered pilot in the complex coordinates.

13. The equalizer of claim 6, wherein the bandwidth control signal is generated to indicate an increase for the bandwidth range of the variable bandwidth LPF used in the frequency-domain interpolation when the signal power ratio is greater than the threshold value, and when the signal power ratio is not greater than the threshold value, the control signal is generated to maintain a current bandwidth of the variable bandwidth LPF used in the frequency-domain interpolation.

14. A method of detecting an echo signal comprising:

receiving a fast Fourier transformed Orthogonal Frequency Division Multiplexing (OFDM) signal;

interpolating the received OFDM signal in the time-domain;

interpolating the output of the time-domain interpolation in the frequency-domain by using a time-domain Low Pass Filter (LPF) with a bandwidth that varies in response to a bandwidth control signal;

calculating first signal powers based on signals generated by the time-domain interpolator;

calculating second signal powers based on signals generated by the frequency-domain interpolator;

generating the bandwidth control signal based on a ratio of the first and second signal powers; and compensating for channel distortion in the fast Fourier transformed OFDM signal using the output generated by the frequency-domain interpolation.

15. A method for echo detection comprising:

measuring a first signal power of at least one scattered pilot signal obtained from a first interpolated signal, interpolated in the time-domain;

measuring a second signal power of at least one other scattered pilot signal obtained from a second interpolated signal, where the second interpolated signal is obtained from interpolating the first interpolated signal in the frequency domain;

calculating a signal power ratio between the first and second signal powers measured;

comparing the signal power ratio to a threshold level to determine the state of an echo signal; and generating a bandwidth control signal based on the determined state of the echo signal.

16. An echo detector device comprising:

a first calculation device which measures a first signal power of at least one scattered pilot signal obtained from a first interpolated signal, interpolated in the time-domain;

a second calculation device which measures a second signal power of at least one other scattered pilot signal obtained from a second interpolated signal, where the second interpolated signal is obtained from interpolating the first time-domain interpolated signal in the frequency- domain;

a divider which calculates a signal power ratio between the first and second signal power measured; and a comparator which compares the signal power ratio to a threshold level to determine the state of an echo signal, and provides a bandwidth control signal based on the determined state of the echo signal to the second calculation device.

* * * * *